United States Patent [19]

Wei et al.

[11] Patent Number: 5,569,496
[45] Date of Patent: Oct. 29, 1996

[54] THERMAL DEPOSITION METHODS FOR ENHANCEMENT OF VEHICLE WHEELS

[75] Inventors: Daniel C. Wei, Ann Arbor; Romulo A. Prieto, Northville, both of Mich.

[73] Assignee: Hayes Wheels International, Inc., Romulus, Mich.

[21] Appl. No.: 356,091

[22] Filed: Dec. 15, 1994

[51] Int. Cl.⁶ .................................................. C23C 4/10
[52] U.S. Cl. .................... 427/450; 427/452; 427/453; 427/455; 427/456
[58] Field of Search .................... 427/453, 456, 427/455, 446, 450, 452

[56] References Cited

U.S. PATENT DOCUMENTS

| | | | |
|---|---|---|---|
| 5,056,630 | 10/1991 | Fujii et al. | 188/24.13 |
| 5,070,228 | 12/1991 | Siemers et al. | 219/121.46 |
| 5,080,056 | 1/1992 | Kramer et al. | 123/193 CP |
| 5,109,150 | 4/1992 | Rogers | 219/121.47 |
| 5,271,967 | 12/1993 | Kramer et al. | 427/455 |

FOREIGN PATENT DOCUMENTS

| | | |
|---|---|---|
| 3722257 | 1/1989 | Germany . |
| 4124423 | 2/1992 | Germany . |

OTHER PUBLICATIONS

Thermal Spraying: Practice, Theory, and Application, American Welding Society, 1985, pp. 6–11, 16, 54–68 and 94. (no month date).

*Primary Examiner*—Katherine Bareford
*Attorney, Agent, or Firm*—MacMillan, Sobanski & Todd

[57] ABSTRACT

A layer of material is thermally sprayed onto a portion of the surface of a vehicle wheel rim drop well with an arc plasma spray gun. Before spraying, the drop well surface is prepared by removing any dirt, oil and oxides. The sprayed layer has a greater density than the metal forming the wheel rim and reduces the porosity of the drop well.

16 Claims, 4 Drawing Sheets

THERMAL DEPOSITION METHODS FOR ENHANCEMENT OF VEHICLE WHEELS

BACKGROUND OF THE INVENTION

The invention relates in general to vehicle wheels and in particular to a method for depositing a layer of material upon a portion of a wheel surface with a thermal spray gun.

Vehicle wheels include an annular wheel rim which is adapted to carry a pneumatic tire. The wheel rim includes an outboard tire bead retaining flange which extends radially outward from the outboard end of the wheel rim to retain the tire upon the wheel. An outboard tire bead seat is formed adjacent to the outboard tire bead retaining flange. The outboard tire bead seat is adapted to carry the outboard tire bead. The outboard tire bead seat is connected by a radial drop well wall to a recessed annular drop well. The drop well facilitates mounting a tire upon the wheel. An annular leg portion connects the drop well to an inboard tire bead seat, which is adapted to carry the inboard tire bead. The inboard end of the wheel rim is formed as an inboard tire bead retaining flange which extends radially outward from the wheel rim to retain the tire upon the wheel.

A circular wheel disc is typically formed across an end of the wheel rim. Alternatively, the wheel disc can be recessed within the wheel rim. The wheel disc includes a wheel hub having a central pilot hole and a plurality of wheel lug holes formed therethrough for mounting the wheel upon a vehicle. The outboard ends of the wheel stud holes are typically counterbored to receive the ends of the wheel retaining nuts. When a wheel is mounted upon a vehicle, the inboard surface of the hub typically contacts a wheel hub. To assure good contact and support between the wheel and the wheel hub, the inboard hub surface is typically faces to form a smooth surface. A plurality of wheel spokes connect the wheel hub to the wheel rim. The wheel spokes support the weight of the vehicle and are designed accordingly.

In the past, vehicle wheels have been fabricated by attaching a stamped steel wheel disc to a rolled steel wheel rim. Also in the past, vehicle wheels have been cast from molten steel alloys or forged from steel alloy billets. Increasingly, vehicle wheels are being formed from light weight metals, such as aluminum, magnesium, titanium, or alloys thereof. Such light weight wheels can be formed with the wheel disc having a pleasing aesthetic shape. The wheel disc outer surface is typically machined to form a smooth surface which can be subsequently finished with a decorative high luster. It is known to form light weight wheels from a one-piece casting or forging. Alternately, light weight wheels can be assembled by attaching a wheel disc to a wheel rim or a full faced wheel disk to a partial wheel rim.

SUMMARY OF THE INVENTION

This invention relates to thermally depositing a layer of material on portions of a vehicle wheel surface to enhance the durability of the wheel.

The invention contemplates thermally depositing a layer of material onto portions of a vehicle wheel rim drop well. The resulting layer has a greater density than the adjacent metal and reduces the porosity of the drop well.

The invention also contemplates thermally depositing a layer of material onto the surface of at least one of the tire bead seats of a vehicle wheel. The deposited layer of material defines a surface having a coefficient of friction which is greater than the coefficient of friction of the wheel rim surface.

A layer of material can be thermally deposited on the inboard surface of a vehicle wheel hub. The deposited layer of material seals the wheel hub surface, thereby protecting the surface from potential corrosion.

Material which is harder than the wheel hub material can be themally eposited in the wheel lug holes to provide a harder bearing surface for the wheel retaining nuts.

Additionally a mixture of a metal and a reinforcing material can be thrmally deposited onto portions of the wheel to form a metal matrix composite reinforcing layer.

Accordingly, it is an oject of the invention to provide an improved vehicle wheel by thermally depositing a layer of material onto a portion of the wheel drop well surface.

Other objects and advantages of the invention will become apparent from the following detailed description of the invention and the accompanying drawings.

DETAILED DESCRIPTION OF THE PREFERRED EMBODIMENT

Figure 1:
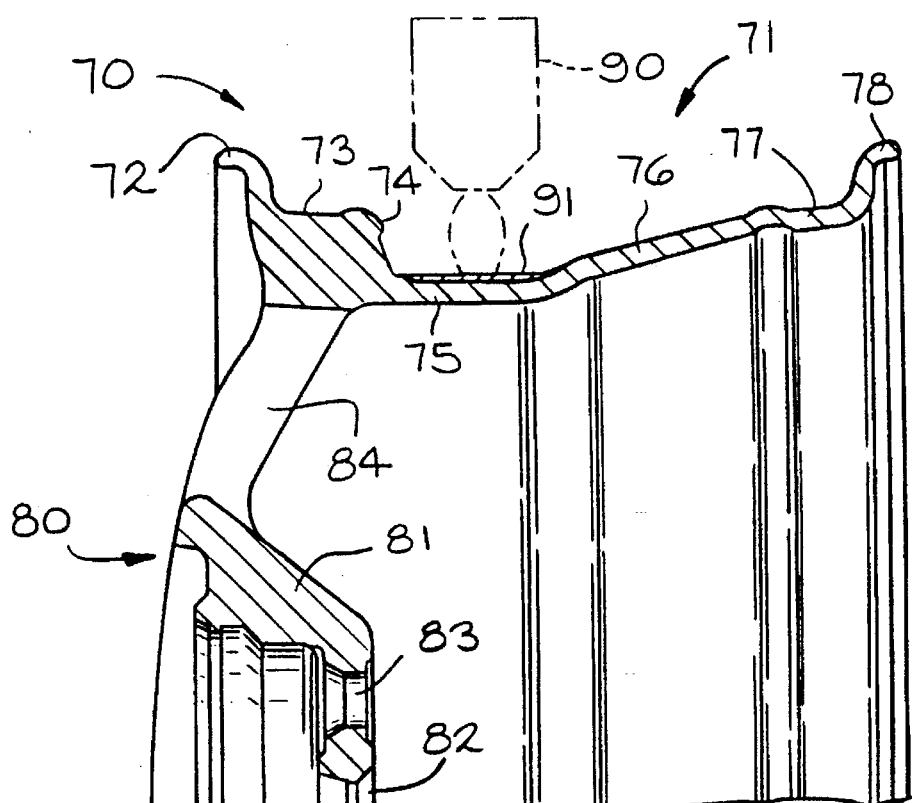
FIG. 1 is a fragmentary sectional view of a vehicle wheel having a layer of metal deposited on the surface of the drop well in accordance with the invention.

Referring to the drawings, there is shown in FIG. 1 a fragmentary sectional view of a typical vehicle wheel 70 formed from an aluminum alloy. While an aluminum alloy wheel 70 is illustrated, it will be appreciated that the invention can be practiced on wheels formed from other light weigh metal alloys, such as magnesium and titanium alloys. The wheel 70 has a rim 71 that includes an outboard tire bead retaining flange 72 which is adjacent to an outboard tire bead seat 73. The outboard tire bead seat 73 is connected by a radial drop well wall 74 to an annular drop well 75. The drop well 75 is adjacent to an annular leg portion 76 of the rim 71. The inboard end of the leg portion 76 is adjacent to an inboard tire bead seat 77, which terminates in an inboard tire bead retaining flange 78. A wheel disc 80 is formed across the outboard end of the wheel rim 71. The wheel disc 80 includes a wheel hub 81 having a central pilot hole 82 and a plurality of wheel lug holes 83 (one shown) formed therethrough. A plurality of spokes 84 (one shown) extend radially from the hub 81 to the wheel rim 71.

Conventional methods for forming vehicle wheels can cause the drop well 75 to be thinner than other portions of the wheel rim 71. This can cause, depending upon the porosity of the metal used to form the wheel, a slow leakage of air through the drop well 75. The air leakage can result in deflation of a tire mounted upon the wheel rim 71.

To improve air retention of the wheel rim 71, the present invention contemplates themally depositing a layer of metal over the outer surface of the drop well 75. The outer surface of the drop well 75 is prepared by removing any dirt, oil or oxides therefrom. Cleaning can include conventional steps, such as immersion of the wheel 70 in a solvent to remove dirt and oil, immersion in a chemical bath to remove oxides and rinsing to remove any solvent and chemicals. The rinse can be by immersion in a water bath or by flushing with a water jet.

A thermal spray gun 90, shown in phantom, deposits an annular layer of metal 91 over the prepared drop well surface. In the preferred embodiment, an arc plasma spray gun is used to deposit the layer of metal 91 on the drop well surface. The spray gun 90 can be traversed axially as the wheel 70 is rotated about its axis to deposit a uniform metal layer 91. As described above, the density of the thermally deposited metal layer 91 is greater than the density of the metal forming the wheel rim 71. Accordingly, the drop well layer 91 is less porous than the wheel rim metal, sealing the drop well 75 and reducing leakage of tire inflation air therethrough.

Figure 2:
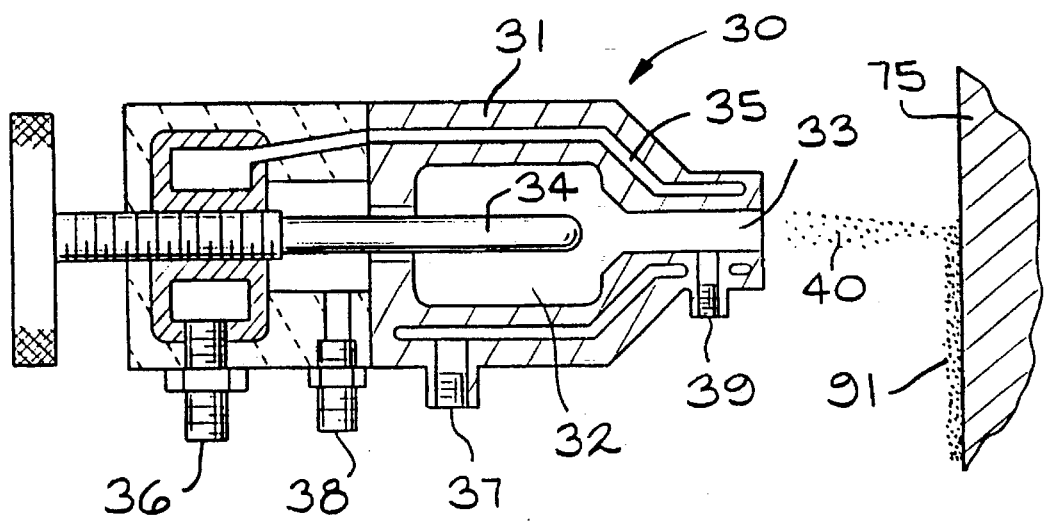
FIG. 2 is a sectional view of an arc plasma spray gun used to deposit the layer of metal shown in FIG. 1.

A sectional view of a typical arc plasma spray gun 30 is shown in FIG. 2. The arc plasma spray gun 30 includes a housing 31 that defines a cylindrically shaped arc chamber 32 and also forms a first electrode. A nozzle 33 connects the arc chamber 32 to the atmosphere. A second electrode 34 extends axially into the arc chamber 32. The housing 31 includes an internal cooling passage 35 formed therein which conveys cooling water around the arc chamber 32 to cool the housing 31. A cooling water inlet port 36 connects the cooling water passage 35 with a supply of cooling water (not shown) while a cooling water outlet port 37 connects the cooling passage 35 with a water discharge hose (not shown). Cooling water is circulated through the cooling passage 35 when the spray gun 30 is operated. A gas inlet port 38 connects the arc chamber 32 to a supply of a mixture of pressurized inert gases, such as argon and nitrogen. A material inlet port 39 communicates with the nozzle 33 downstream from the arc chamber 32 and is connected to a pressurized supply of a powdered metal (not shown) that is to be sprayed onto the surface.

To operate the arc plasma spray gun 30, a DC arc (not shown) is struck between the spray gun electrodes 31 and 34. The arc has a maximum temperature of approximately 1,600° C. The arc temperature causes a rapid expansion of the inert gas mixture supplied through the gas inlet port 36 to form a plume 40 of ionized gases. The plume of ionized gases 40 is discharged through the nozzle 33. In the preferred embodiment, powdered aluminum, entrained in a carrier gas, such as helium, is injected under pressure through the material inlet port 39 into the plasma plume 40 in the nozzle 33. The reasons for using powered aluminum will be explained below. The powdered aluminum includes very small particles which are melted in the plasma plume 40 to form small droplets of molten aluminum. The aluminum droplets are carried by the plasma plume 40 which is directed at a potion of the outer surface of the wheel rim drop well 75, as shown in FIG. 1. The aluminum droplets splatter onto the outer surface of the drop well 75 to form the layer 91 of aluminum. The aluminum droplets and wheel surface cool rapidly, fusing the aluminum to the drop well surface and causing the aluminum layer 91 to have a strong physical bond with the drop well surface.

As additional aluminum droplets are sprayed onto the drop well surface, they are fused to the initially deposited aluminum to increase the thickness of the aluminum layer 91. The final thickness of the aluminum layer 91 is proportional to the applied arc power, the flow of the aluminum and the duration of the thermal spraying step.

It will be appreciated that other commercially available thermal spraying means can be used practice the invention. For example, an electric arc gun with a aluminum wire or rod fed into the plasma plume or a high velocity oxygen hydrocarbon fuel spray gun could be used to spray the aluminum droplets onto the wheel 71.

While the metal layer 91 has been described as being formed on the outer surface of the drop well 75, the layer 91 also can be formed on the inner surface thereof. Furthermore, while FIG. 1 shows the metal layer extending across only the drop well 75, it will be appreciated that the metal layer 91 also can extend axially across the leg portion 76 of the wheel rim 71.

In the preferred embodiment, the same metal that is used to form the wheel rim 71 is used to form the metal layer 91. However, it will be appreciated that because of the bonding nature of the thermal spray process, other metals and non-metallic materials also can be used to form the layer 91 over the drop well surface.

Figure 3:
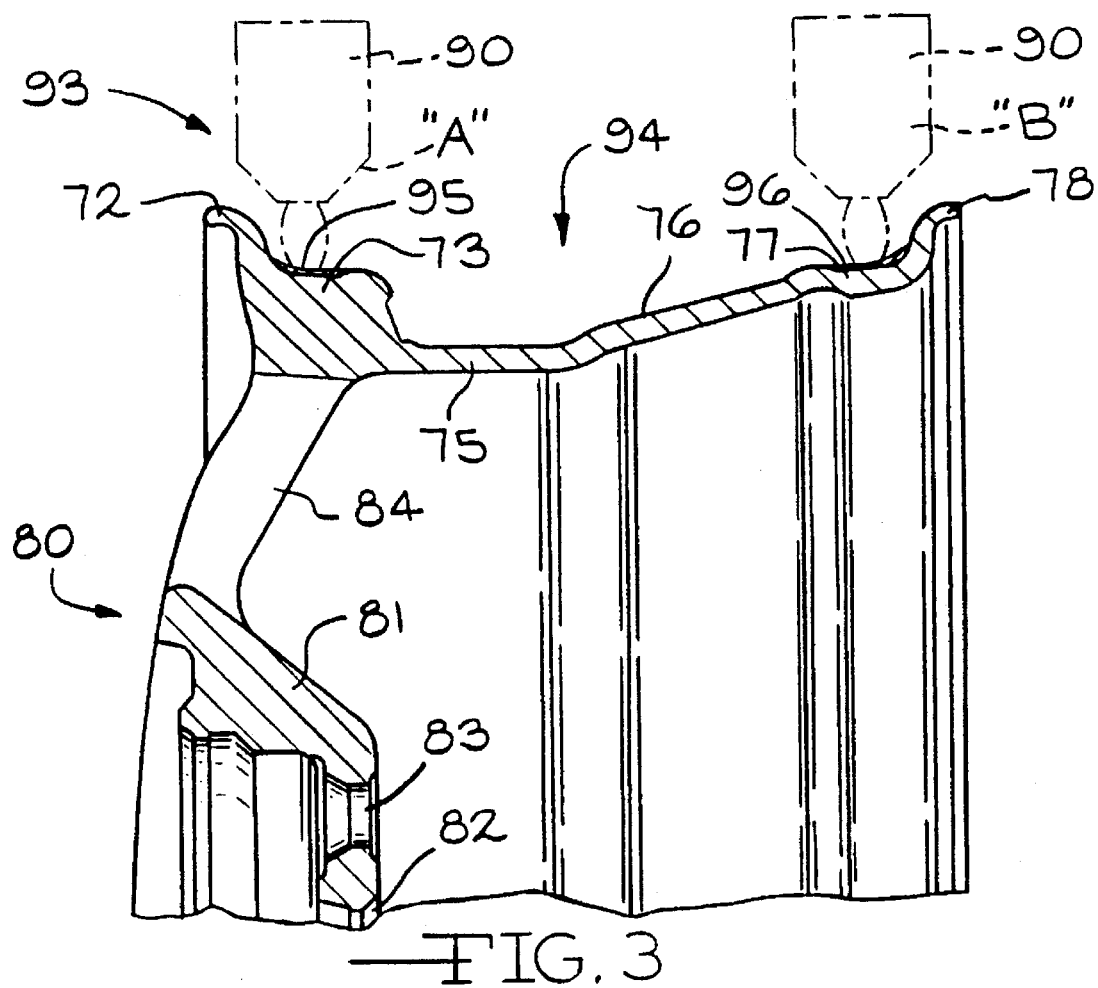
FIG. 3 is a fragmentary sectional view of a vehicle wheel having layers of metal deposited on the surfaces of the tire bead seats in accordance with the invention.

An alternate embodiment of the invention contemplates themally depositing a layer of material over the tire bead seats. This alternate embodiment is illustrated in FIG. 3 which includes a fragmentary sectional view of a wheel 93. Portions of the wheel 93 which are identical to corresponding portions of the wheel 70 are identified by the same numerical indicators used in FIG. 1. The wheel 93 includes an annular wheel rim 94 having outboard and inboard tire bead seats 73 and 77 formed therein.

The outer surfaces of the tire bead seats 73 and 77 are prepared by removing any dirt, oil or oxides therefrom. The thermal spray gun 90, shown in phantom in FIG. 3, deposits annular metal layers 95 and 96 on the outer surface of the tire bead seats 73 and 77. The outboard tire bead seat metal layer 95 is deposited with the thermal spray gun 90 in position "A". The spray gun 90 can be axially traversed about position "A" and the wheel 94 rotated about its axis while the metal layer 95 is deposited. After completing the outboard bead seat metal layer 95, the spray gun 90 is axially moved to the position labeled "B" to deposit the inboard bead seat metal layer 96. Alternately, two thermal spray guns (not shown) can be used to deposit both metal layers 95 and 96 simultaneously.

In the preferred embodiment, the thermal spray gun 90 is an arc plasma gun; however, other types of thermal spray guns can be used to deposit the metal. Also in the preferred embodiment, the same metal used to form the wheel rim 94 is used to form the metal layers 95 and 96. However, it will be appreciated that because of the bonding nature of the thermal spray process, other metals and non-metallic materials can be used to form the layers 95 and 96.

The metal layers 95 and 96 are not polished, but are left as sprayed. Accordingly, the surface of the metal layers 95 and 96 have a higher coefficient of friction than the surfaces of the adjoining portions of the wheel rim 71. As a result, the bead seats 73 and 77 have an enhanced capability to prevent tire beads from rotating relative to the wheel rim 71 when a tire is mounted on the wheel 93.

It will be further appreciated that, while the invention has been described above as forming annular layers of metal on the drop well surface and the tire bead seat surfaces, it is also possible to spray a layer of metal or non-metallic material across the entire outer surface of the wheel rim 71. The resulting layer of material would extend axially from the outboard tire bead retaining flange 72 to the inboard tire bead retaining flange 78.

Figure 4:
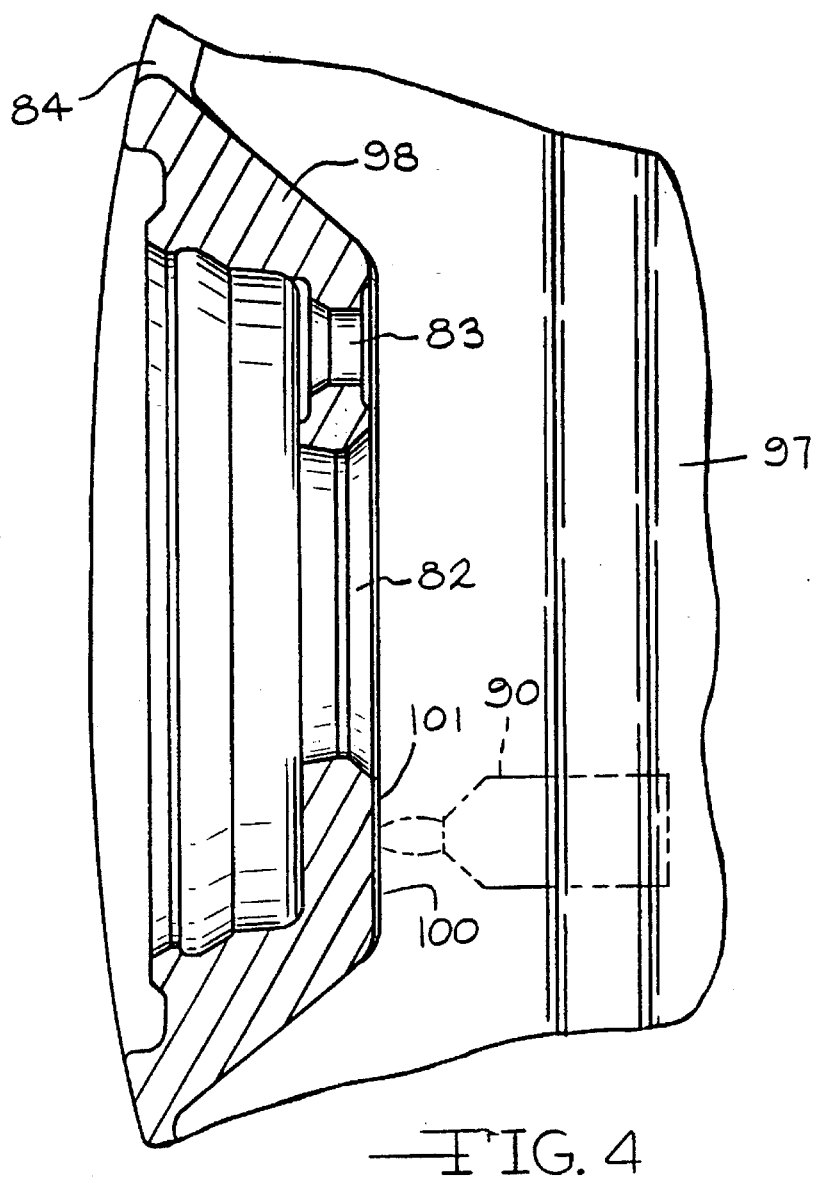
FIG. 4 is a fragmentary sectional view of a vehicle wheel having a layer of material deposited upon the wheel hub mounting surface in accordance with the invention.

A third embodiment of the invention contemplates thermally depositing a protective layer over a wheel hub mounting surface. This embodiment is illustrated in FIG. 4, which includes an enlarged fragmentary sectional view of a wheel 97 having a central wheel hub 98. Portions of the wheel hub 98 which are identical to corresponding portions of the wheel hub 81 in FIG. 1 are identified by the same numerical indicators. The inboard side of the wheel hub 98 includes a hub mounting surface 100. The mounting surface 100 is typically machined flat to assure optimal support of the wheel 97 after installation upon a vehicle (not shown). When the wheel 97 is mounted upon a vehicle, the mounting surface 100 is often positioned adjacent to and contacting a cast iron brake drum (not shown). The cast iron can react galvanically with the metal forming the wheel 97, especially when the wheel is formed form magnesium and the iron/magnesium interface is subject to high humidity or precipitation. The chemical reaction can result in conrrosion of the wheel mounting surface 100.

Before depositing a protective layer over the wheel mounting surface 100, the mounting surface 100 is prepared by removing any din, oil or oxides. The thermal spray gun 90 then deposits a protective layer 101 of electrically inert material, such as a ceramic, over the mounting surface 100. The protective layer 101 seals the mounting surface 100, insulating the wheel metal from the cast iron brake drum and thus preventing corrosion from forming on the mounting surface 100. The protective layer 101 is not polished, but is left as sprayed. Accordingly, the surface of the protective layer 101 has a higher coefficient of friction than the mounting surface 100. As described above, an arc plasma spray gun is used in the preferred embodiment to form the protective layer 101, however, other types of thermal spray guns can be used. The spray gun 90 can be traversed radially over the mounting surface 100 while the wheel 97 is rotated about its axis to deposit a uniform protective layer 101.

Figure 5:
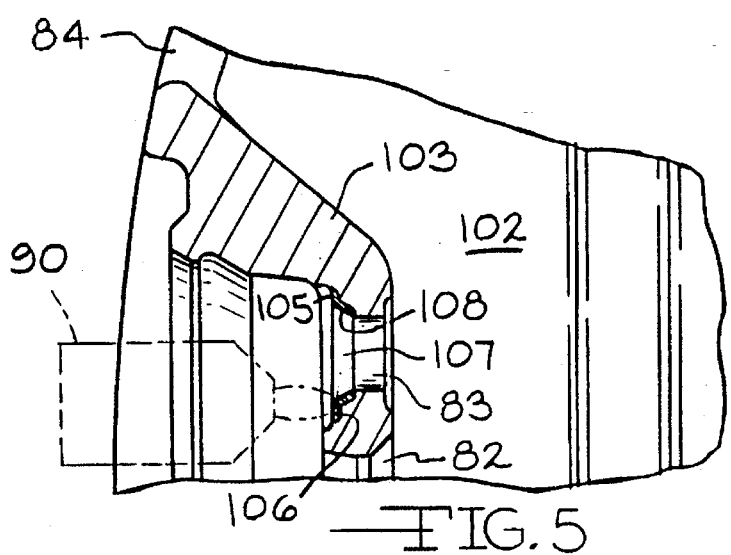
FIG. 5 is a fragmentary sectional view of a vehicle wheel having a layer of material deposited upon the wheel lug hole surface in accordance with the invention.

A fourth embodiment of the invention is illustrated in FIG. 5, which contemplates thermally depositing a layer of material about the outboard end of the wheel lug holes 83. FIG. 5 shows an enlarged fragmentary sectional view of a wheel 102 that includes a central wheel hub 103. Portions of the wheel hub 103 which are identical to corresponding portions of the wheel hub 81 in FIG. 1 are identified by the same numerical indicators. As described above, the wheel hub 103 includes wheel lug holes 83. The outboard end of the wheel lug holes 83 can include a cylindrical counterbore 105 for seating a wheel lug nut (not shown). The counterbore includes a bottom surface 106 against which an end of the wheel lug nut is seated. Additionally, an outboard portion 107 of the wheel lug hole 83 can be tapered to assist centering of the wheel hub 103 upon the vehicle mounting surface. When the wheel hub 103 is formed from aluminum or another relatively soft metal, it is known to include an annular bushing (not shown) formed from a ferrous material in the counterbore 105. The bushing covers the counterbore bottom surface 106 and provides a bearing surface for the wheel lug nut. The bearing surface distributes the torquing force applied to the wheel lug nut. This reduces the possibility of deforming the wheel hub 103 when the wheel lug nuts are torqued.

This embodiment of the invention contemplates replacing the counterbore bushing in each of the lug hole counterbores 105 with a thermally deposited reinforcing layer 108. Accordingly, the counterbore bottom surface 106 and the surface of the lug hole tapered portion 107 are prepared by removing any dirt, oil or oxides therefrom. Then, as shown in FIG. 5, the reinforcing layer 108 is deposited with the thermal spray gun 90 onto the counterbore bottom surface 106. In the preferred embodiment, the thermal spray gun 90 is an arc plasma gun, however other types of thermal spray guns can be used to deposit the layer 108. The material used to form the layer 108 can be a ceramic or a hard metal, such as stainless steel or nickel. A portion of the reinforcing layer 108 extends axially into the lug hole 83 and over the surface of the tapered portion 107. It will be appreciated, however, that the invention can be practiced with the reinforcing layer 108 covering only the counterbore bottom surface 106. The reinforcing layer 108 is not polished, but forms a surface having a greater the coefficient of friction than the counterbore bottom surface 106.

The thermal spay gun 90 can be mounted upon a robotic arm and indexed between the lug holes 83 to deposit a reinforcing layer 108 in each lug hole counterbore 105. Alternately, a plurality of thermal spray guns can be mounted upon a mechanism (not shown) that would simultaneously deposit the layers 108 in all the wheel lug hole counterbores 105.

Figure 6:
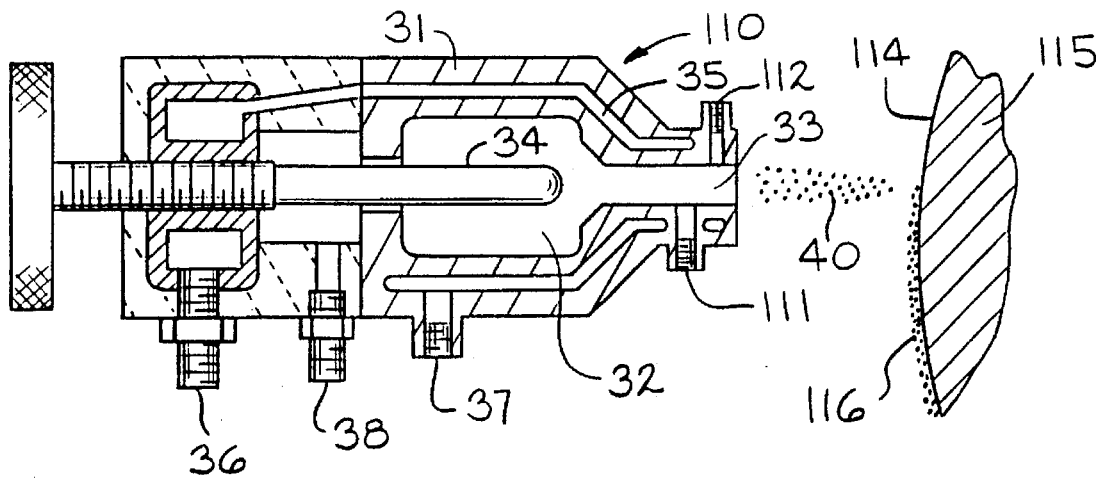
FIG. 6 is a sectional view of an alternate embodiment of the arc plasma spray gun shown in FIG. 2.

A sectional view of an alternate embodiment 110 of the arc plasma spray gun which is capable of thermally depositing a mixture of two materials is shown in FIG. 6. As will be explained below, the spray gun 110 can be used to thermally deposit a metal matrix composite layer to reinforce a portion of a vehicle wheel. The components of the spray gun 110 which are the same as components of the arc plasma gun 30 described above are labeled with the same numerical designators. The spray gun 110 includes a first material inlet port 111 which communicates with the nozzle 33 downstream form the arc chamber 32. The first material inlet port 111 is connected to a pressurized supply of a powdered metal (not shown), such as aluminum, magnesium and titanium, or alloys thereof. The spray gun 110 also includes a second material inlet port 112 which also communicates with the nozzle 33 downstream from the arc chamber 32. The second material inlet port 112 is connected to a pressurized supply of a nonmetallic reinforcing material (not shown), such as silicon carbide, alumina, silica and graphite. The reinforcing material can be in the form of particulates, small fibers or whiskers While the second inlet port 112 is shown downstream from the first inlet port 111 in FIG 6 it will be appreciated that the positions thereof can be reversed or that the inlet ports 111 and 112 can be located opposite one another.

During operation of the spray gun 110, a DC arc (not shown) is struck between the spray gun electrodes 31 and 34. As described above, the high arc temperature causes a rapid expansion of the inert gas mixture supplied through the gas inlet port 36 to form a plume 40 of ionized gases. The plume of ionized gases 40 is discharged through the nozzle 33. The powdered metal, which is entrained in an inert carrier gas as such as helium, is injected under pressure through the first material inlet port 111 into the plasma plume 40 in the nozzle 33. The powdered metal includes very small particles which are melted in the plasma plume 40 to form small droplets of molten metal. Simultaneous with the injection of the powered metal, the reinforcing material, which is entrained in an inert carrier gas, such as helium, is injected under pressure through the second material inlet port 112 into the plasma plume 40 in the nozzle 33. The particles of reinforcing material are mixed with the molten metal droplets in the plasma plume 40. The mixture of reinforcing material particles and molten metal droplets are carried by the plasma plume 40. The plasma plume 40 is directed at a surface 114 of a metal component 115, such as a vehicle wheel, which is shown in fragmentary section in FIG. 6. The spray gun 110 deposits a layer 116 of the reinforcing material particles/molten metal mixture on the component surface 114.

The powdered metal supplied to the first material inlet port 111 is similar to the metal used to form the component 115. For example, powdered aluminum could be supplied for spraying onto an aluminum alloy component. Accordingly, the initial molten metal droplets deposited upon the surface 114 fuse thereto, binding the sprayed metal securely to the surface 114. Upon cooling, the sprayed metal combines with the reinforcing material to form a metal matrix composite (MMC) reinforcing layer 116 which covers a portion of the component surface 114. It will be appreciated that the aluminum and alumina are used in the above example to illustrate the invention. As indicated above, any of a number of conventional reinforcing materials can be combined with a number of powered metals to form the MMC.

It will be appreciated that other commercially available thermal spraying means can be used to form the reinforcing MMC layer 116. For example, a wire or rod formed from the metal can be fed into the plasma plume of an electric arc gun or a high velocity oxygen hydrocarbon fuel spray gun could be used to spray the metal droplets onto the metal component 115. In both cases, the reinforcing material would be entrained in an inert gas and injected under pressure into the nozzle of the spray gun through a material inlet port. Additionally, the arc plasma spray gun 30 shown in FIG. 2 can be used to deposit the MMC layer by supplying a mixture of the powdered metal and reinforcing material to the material inlet port 39.

Figure 7:
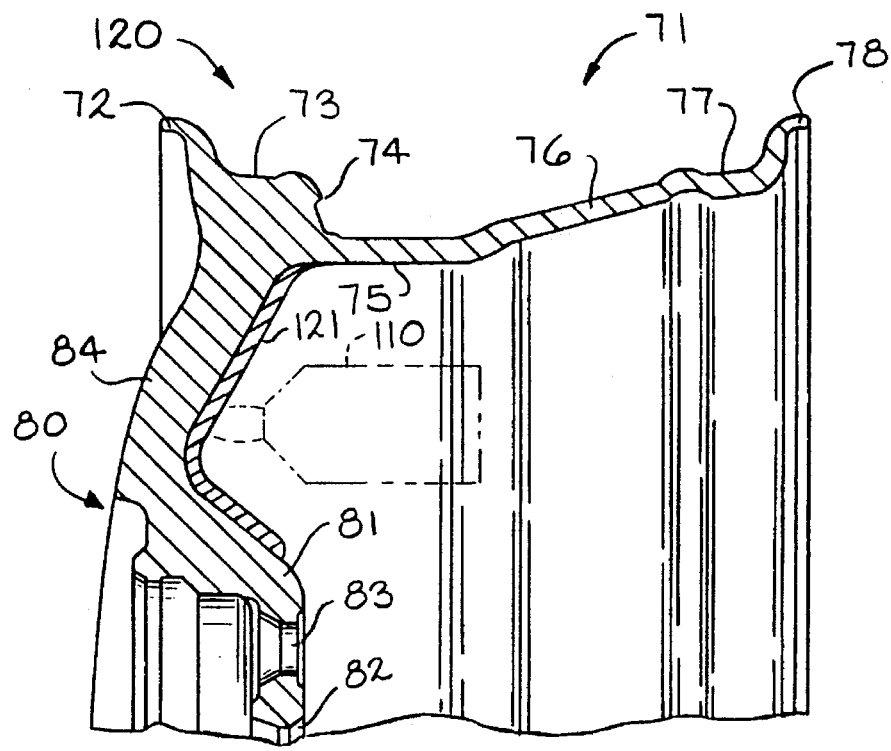
FIG. 7 is a fragmentary sectional view of a vehicle wheel having a layer of a metal matrix composite material deposited upon an inner surface in accordance with the invention.

As shown in FIG. 7, the spray gun 110 can be positioned inside a wheel 120 to deposit a MMC reinforcing layer 121 on an inner surface thereof. Portions of the wheel 120 which are identical to corresponding portions of the wheel 70 are identified by the same numerical indicators used in FIG. 1. The spray gun 110 and/or the wheel 120 can be rotated about the wheel axis to assure that the MMC reinforcing layer 121 is formed uniformly. As shown in FIG. 7, the MMC reinforcing layer 121 extends from a portion of the wheel hub 81, across the inside surface of the wheel spokes 84 and onto a portion of the inside surface of the wheel rim 71. The MMC reinforcing layer 121 strengthens the wheel spokes 84 (one shown) allowing use of a smaller spoke cross sectional area. Additionally, the MMC reinforcing layer 121 can be extended in an axial direction across the inside surface of the wheel rim 71. This can allow use of a thinner wheel rim 71. Alternately, the MMC reinforcing layer 121 applied only to the inside surface of the wheel rim 71 or to other selected inner or outer surfaces of the wheel 121.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for reducing porosity of a vehicle wheel comprising the steps of:

(a) providing a vehicle wheel formed from a material having a first density, the wheel including a wheel rim having an inner surface and an outer surface, said outer wheel rim surface adapted to cooperate with a vehicle tire to define an air chamber; and (b) depositing a layer of material with a thermal spray gun onto a portion of said outer surface of said wheel rim, the deposited layer having a second density that is greater than said first density.

2. The method according to claim 1 wherein the wheel provided in step (a) includes a drop well formed in said wheel rim and further wherein in step (b) the layer material is deposited onto a portion of an outer surface of said drop well.

3. The method according to claim 2 wherein the layer of material is deposited in step (b) circumferentially said drop well.

4. The method according to claim 3 wherein said wheel rim includes a leg portion formed therein adjacent to the drop well and further wherein the layer of material deposited in step (b) extends axially across both the drop well and the leg portion.

5. The method according to claim 4 wherein said wheel rim includes outboard and inboard tire bead retaining flanges formed on axial ends thereof and further wherein the layer of material deposited in step (b) extends axially from the outboard tire bead retaining flange to the inboard tire bead retaining flange.

6. The method according to claim 1 wherein the thermal spray gun is an arc plasma spray gun.

7. The method according to claim 1 wherein prior to step (b), the surface is prepared by removing any dirt, oil and grease therefrom.

8. A method for finishing a portion of a vehicle wheel hub comprising the step of:

(a) providing a vehicle wheel having a wheel hub which includes an inboard mounting surface; and (b) depositing a layer of material with a thermal spray gun onto a portion of said wheel hub inboard mounting surface, the layer of material sealing said portion of said hub mounting surface.

9. The method according to claim 8 wherein the material thermally deposited onto the mounting surface is a ceramic material.

10. A method for strengthening a portion of a vehicle wheel hub comprising the steps of:

(a) providing a vehicle wheel having a wheel hub formed from a material having a first hardness which includes a plurality of wheel lug holes formed therethrough, each wheel lug hole having an outboard portion which is counterbored, the counterbored portion adapted to receive a wheel retaining nut, the counterbored portion defining a surface which is adapted to seat a wheel nut; and (b) depositing a layer of material having a second hardness with a thermal spray gun onto a portion of said counterbore surface of at least one of said wheel lug holes, said second hardness being greater than first hardness.

11. A method for strengthening a portion of a vehicle wheel hub comprising the step of:

(a) providing a vehicle wheel formed from a metal alloy, said wheel having an annular rim and a central hub retained within said rim by a plurality of spokes, each of said spokes having an inboard surface; and (b) utilizing a thermal spray gun to deposit a mixture of a strengthening material and a metal onto a portion of said inboard surface of at least one of said wheel spokes to form a metal matrix composite layer.

12. The method according to claim 11 wherein the reinforcing material is selected from the group consisting of silicon carbide, alumina, silica and graphite.

13. The method according to claim 11 wherein the reinforcing material includes particulates.

14. The method according to claim 11 wherein the reinforcing material includes fibers.

15. The method according to claim 11 wherein the reinforcing material includes whiskers.

16. The method according to claim 11 wherein said wheel provided in step (a) includes a wheel disc and said mixture is deposited in step (b) onto a portion of an inboard surface of said wheel disc.

* * * * *